United States Patent [19]

Novakovich et al.

[11] Patent Number: 5,289,176

[45] Date of Patent: Feb. 22, 1994

[54] MULTI-MASTER RESOLUTION OF A SERIAL BUS

[75] Inventors: Michael R. Novakovich; Joseph S. Majewski, both of Pittsburgh, Pa.

[73] Assignee: AEG Transportation Systems, Inc., Pittsburgh, Pa.

[21] Appl. No.: 853,960

[22] Filed: Mar. 19, 1992

[51] Int. Cl.5 ............................................. G05B 23/02
[52] U.S. Cl. ......................... 340/825.08; 340/825.06; 370/85.1; 370/85.8; 370/85.9; 370/95.2
[58] Field of Search .................... 370/85.1, 85.8, 85.9, 370/95.2; 340/825.06, 825.08

[56] References Cited

U.S. PATENT DOCUMENTS 5,053,964 10/1991 Mister et al. .................... 364/424.01
5,142,277 8/1992 Yarberry et al. ................ 340/825.57

Primary Examiner—Douglas W. Olms
Assistant Examiner—Russell W. Blum
Attorney, Agent, or Firm—Spencer, Frank & Schneider

[57] ABSTRACT

A method and apparatus for determining an overall master node for an overall communication network with a serial bus, wherein the overall communication network comprises an original communication network connected to a new communication network via a serial bus with high level data link control (HDLC) packets. The method and apparatus are especially applicable to trainline monitor systems since such systems are frequently divided up and rearranged because their associated trains are frequently divided up and rearranged. The method involves performing a series of steps in order to relinquish mastership of certain master nodes placing those master nodes in an inactive state and making a desired master node an overall master node of the resulting overall trainline monitor system, and the apparatus involves a corresponding series of means for performing these steps.

7 Claims, 5 Drawing Sheets

MULTI-MASTER RESOLUTION OF A SERIAL BUS

CROSS REFERENCE TO RELATED APPLICATIONS

This application is related to the following copending applications assigned to the same assignee as the present application which are hereby incorporate by reference:

U.S. patent application Ser. No. 07/686,927, entitled "PROPULSION CONTROL SYSTEM CENTRAL PROCESSING UNIT BOARD" filed Apr. 18th, 1991, by William F. Molyneaux;

Ser. No. 07/853,250, by Michael R. Novakovich and Joseph S. Majewski, entitled "A METHOD AND APPARATUS FOR MONITORING AND SWITCHING OVER TO A BACK-UP BUS IN A REDUNDANT TRAINLINE MONITOR SYSTEM" filed Mar. 18th, 1992;

Ser. No. 07/853,420, by Joseph S. Majewski, entitled "COLLISION HANDLING SYSTEM" filed Mar. 18th, 1992;

Ser. No. 07/853,796, by Michael R. Novakovich and Joseph S. Majewski, entitled "A METHOD AND APPARATUS FOR CHRISTENING A TRAINLINE MONITOR SYSTEM" filed Mar. 18th, 1992;

Ser. No. 07/853,540, by Michael R. Novakovich and Richard D. Roberts, entitled "A METHOD AND APPARATUS FOR LOAD SHEDDING USING A TRAINLINE MONITOR SYSTEM" filed Mar. 18th, 1992;

Ser. No. 07/853,281, by Michael R. Novakovich and Richard D. Roberts, entitled "A METHOD AND APPARATUS FOR PLACING A TRAINLINE MONITOR SYSTEM IN A LAYUP MODE" filed Mar. 18th, 1992;

Ser. No. 07/853,186, by Henry J. Wesling, Michael R. Novakovich and Richard D. Roberts, entitled "REAL-TIME REMOTE SIGNAL MONITORING" filed Mar. 18th, 1992;

Ser. No. 07/853,402, by William F. Molyneaux, entitled "COMMUNICATIONS CONTROLLER CENTRAL PROCESSING UNIT BOARD" filed Mar. 18th, 1992;

Ser. No. 07/853,204, by Henry J. Wesling, Michael R. Novakovich and Richard D. Roberts, entitled "DISTRIBUTED PTU INTERFACE" filed Mar. 18th, 1992;

BACKGROUND OF THE INVENTION

1. Field of the Invention

This invention relates in general to a method and apparatus for avoiding communication protocol errors where a plurality of master nodes are present on a serial bus and in particular to a method and apparatus for resolving multi-master nodes on a train communication system which uses high level data link control (HDLC) communication equipment with DIN 43322 specification.

2. Description of the Related Art

A train communication system is being developed by the assignee of the present application which, based on the proposed European specification DIN 43322 for "Serial Interfaces to Programmable Electronic Equipment for Rail Vehicles," incorporated herein by reference, enables a master node located typically in a head car of a train to communicate via a serial bus to slave nodes on middle cars of the train and on a tail car of the train. See also, "International Standard-Information processing systems-Data communication-High-level data link control elements of procedures, ISO 4335", Third edition, Global Engineering Documents, Irvine, Calif., 1987, the subject matter of which is also incorporated herein by reference. However, trains are often reconfigured and rearranged by, for example, hooking one train up to the last car of another train resulting in a multi-master train communication system. The train communication systems of the two respective trains, now joined, thus have a conflict as to which master node becomes the overall master node for the newly configured train. There is a need for each of the original train communication systems to have the capability of resolving this conflict to provide an overall train communication system with an overall master node.

SUMMARY OF THE INVENTION

Therefore, an object of this invention is to provide a method and apparatus for resolving such conflicts in a train communication system comprising a original train communication system and a new train communication system providing an overall train communication system with a single overall master node.

The above and other objects, advantages and features are accomplished in accordance with the invention by the provision of a method of multi-master resolution of a bus for a first configured train having a first communications network including a first bus, a master node and at least one slave node including an end slave node. The method includes the detecting additional nodes and determining if the additional nodes are part of another configured train.

If the additional nodes are part of another configured train including another master node, then bus master resolution is performed as follows. If the master node of the first configured train is not on a tail car of the first configured train, then the first configured train is reconfigured together with the another configured train giving bus control to the master node of the another configured train.

If the master node of the first configured train is on a tail car of the first configured train, and if the master node of the another configured train is not on a tail car of the another configured train, then the first configured train is reconfigured together with the another configured train giving bus control to the master node of the first configured train.

If the master node of the first configured train is on a tail car of the first configured train, and if the master node of the another configured train is on a tail car of the another configured train, than an operator of the train is signalled to perform manual bus master resolution by keying down one of the two master nodes and thereafter the first configured train is reconfigured together with the another configured train giving bus control to the master node not keyed down by the operator.

In a further embodiment of the method, the detecting additional nodes includes periodically checking by the end slave node for additional nodes connected to the bus under command from the master node of the first configured train by sending a first TEST message on the bus. The additional nodes are detected by receipt of second TEST messages therefrom in response to the first TEST message. Whether the additional nodes are part of another configured train is determined by information contained in respective second TEST messages thereof.

In a further embodiment of the method, if the additional nodes are not part of another configured train, the first configured train is reconfigured together with the additional nodes giving bus control to the master node of the first configured train.

According to other features, the reconfiguring includes defining a new end slave node, and the first and second TEST messages are high level data link control packets.

In order to accomplish the above objects and advantages of the invention, an apparatus for multi-master resolution of a bus for a first configured train having a first communications network including a first bus, a master node and at least one slave node including an end slave node, is provided. The apparatus includes first means for detecting additional nodes and determining if the additional nodes are part of another configured train, and second means for performing bus master resolution if the additional nodes are part of another configured train including another master node.

The second means includes third means for reconfiguring the first configured train together with the another configured train giving bus control to the master node of the another configured train if the master node of the first configured train is not on a tail car of the first configured train, fourth means for reconfiguring the first configured train together with the another configured train giving bus control to the master node of the first configured train if the master node of the first configured train is on a tail car of the first configured train, and if the master node of the another configured train is not on a tail car of the another configured train, fifth means for signalling to an operator of the train to perform manual bus master resolution by keying down one of the two master nodes if the master node of the first configured train is on a tail car of the first configured train, and if the master node of the another configured train is on a tail car of the another configured train, and sixth means, responsive to the manual bus master resolution, for thereafter reconfiguring the first configured train together with the another configured train giving bus control to the master node not keyed down by the operator.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

Figure 1:
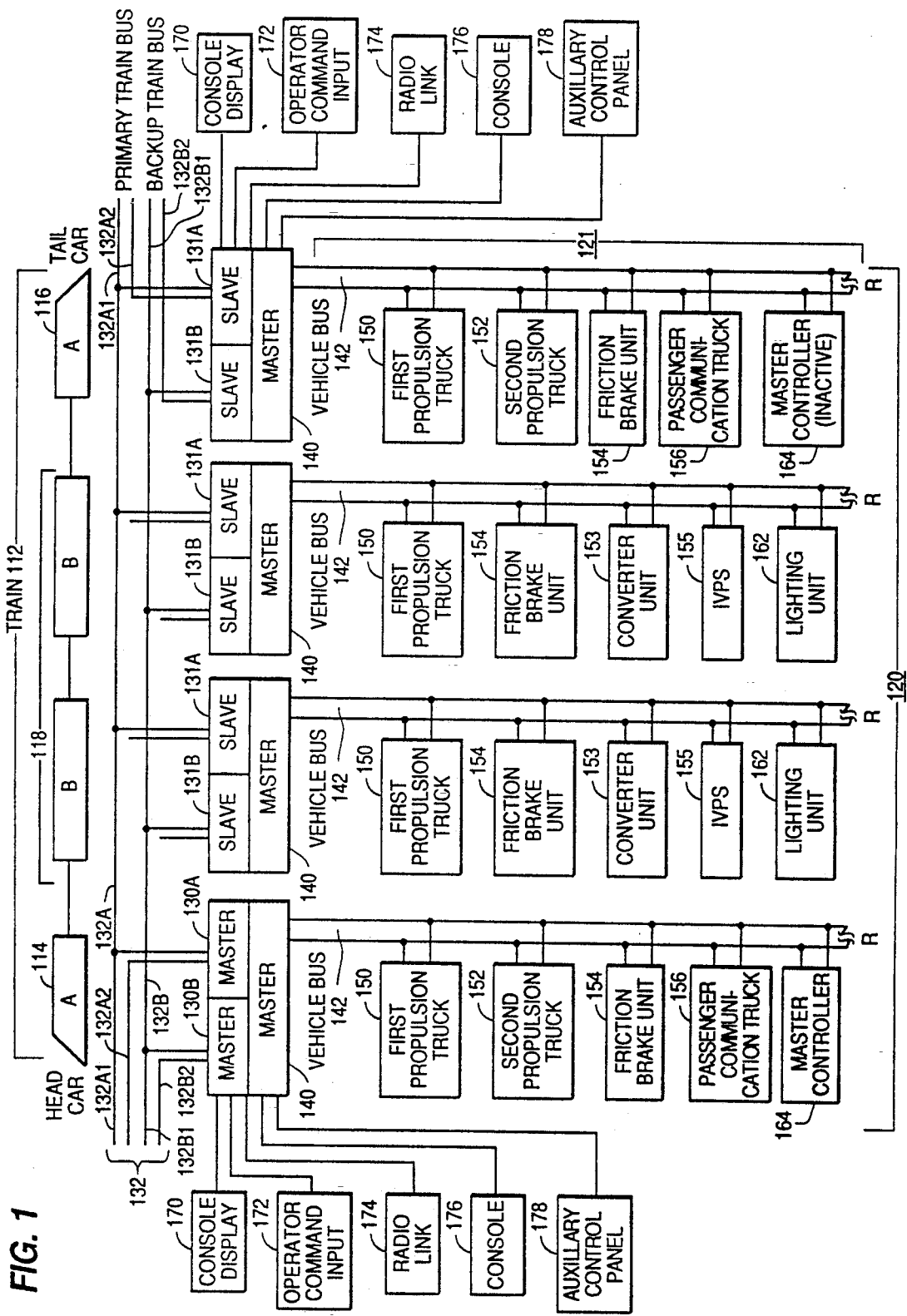
FIG. 1 is a schematic diagram of a trainline monitor system and an associated train in which the present invention finds particular usefulness.

Referring now to FIG. 1, there is shown a Trainline Monitor (TLM) System 120 in which the invention finds particular use. FIG. 1 shows a representative train 112 with a head car 114, a tail car 116, and middle cars 118. Only two middle cars 118 are shown, however a typical commuter train may have from one to ten middle cars 118 having essentially the same equipment on board.

Head car 114 has redundant train bus masters including primary train bus master 130A and backup train bus master 130B as shown. Primary train bus master 130A serves as a master node for primary train bus 132A and backup train bus master 130B serves as a master node for primary train bus backup train bus 132B. Primary train bus 132A and backup train bus 132B make up redundant train buses 132. In addition, middle cars 118 and tail car 116 each have redundant train bus slaves including primary train bus slave 131A and backup train bus slave 131B.

Primary train bus 132A has a main channel 132A1 and an auxiliary channel 132A2. Similarly, back-up train bus 132B has a main channel 132B1 and an auxiliary channel 132B2. Unless otherwise indicated, communications on primary train bus 132A take place on main channel 132A1 and communications on back-up train bus 132B take place on main channel 132B1. Communications on auxiliary channels 132A2 and 132B2 only occur when primary train bus slave 131A and back-up train bus slave 131B "conclude" that they are on a tail car 116 as discussed for example in concurrently filed and commonly owned U.S. patent application Ser. No. 853,796, "A Method and Apparatus For Christening a Trainline Monitor System."

Each car 114, 116 and 118 has a vehicle bus master 140 with a vehicle bus 142. As used herein, trainline monitor system (TLM) 120 is intended to encompass redundant train bus masters 130, redundant train bus slaves 131, redundant train buses 132, vehicle masters 140, vehicle buses 142 and intelligent subsystem interfaces (not separately shown) to vehicle buses 142 discussed below.

TLM system 120 is used to interconnect the various subsystems. Examples of subsystems which may be found on head car 114 include first propulsion truck 150, second propulsion truck 152, friction brake unit 154, passenger communication unit 156 and master controller 164 for controlling first and second propulsion trucks 150, 152 and friction brake unit 154. Other subsystems may include a door control unit (not shown), a heating, ventilation and air conditioning unit (HVAC) (not shown), a lighting unit 162, etc. Status information about the vehicle subsystems is requested, furnished and displayed according to the present invention.

Middle cars 118 can have the same subsystems as head car 114 but they typically would not have a second propulsion truck 152 or master controller 164 but instead would have a convertor unit 153 and an intermediate voltage power supply (IVPS) 155. Tail car 116 has the same subsystems as head car 114 but with an inactive master controller 164. The following discussion regarding train bus master 130A applies to train bus master 130B as well.

Head car 114 has, in addition to redundant train bus masters 130A and 130B, a console display 170, operator command input unit 172, radio link unit 174, console 176 and auxiliary control panel 178, which facilitate control and communications by a train operator.

Vehicle bus master 140 with redundant train bus masters 130A, 130B or redundant train bus slaves 131A, 131B can be embodied in three separate CPUs or a single CPU with a multitasking operating system and 3 separate I/O ports. Each of the train buses 132A and 132B, with its master and slave devices, are preferably configured as an HDLC packet communications network.

Referring to head car 114, vehicle bus master 140 communicates with one of redundant train bus masters 130A and 130B which in turn communicate with the rest of TLM system 120 via one of the primary train bus 132A and backup train bus 132B, respectively. Vehicle bus 142 has predetermined nodes and therefore does not have to deal with such considerations as geographic addressing or car orientation. Vehicle bus 142 can be, for example, an Intel BITBUS in which case the subsystems would have BITBUS interfaces.

Vehicle bus master 140 and the various subsystems 150-156, etc., operate under standard master-slave communications protocols, such as Synchronous Data Link Control (SDLC), using a multidrop RS-485 serial link. Vehicle bus master 140, vehicle bus 142 and the various vehicle subsystems comprise a master-slave communication subsystem 121.

Communications on the TLM system will be described below, in particular, communications which provide information to an operator of the master vehicle processing system 101 about particular subsystems 150-156 on one or more representative vehicles 118 of the train 112 over the TLM communications network, as described with reference to FIG. 1

The TLM system 120 is connected to first and second propulsion trucks 150 and 152 by vehicle bus 142. The TLM system 120 can transmit test commands, propulsion commands, real-time clock synchronization information, etc., to the first and second propulsion trucks 150 and 152. First and second propulsion trucks 150 and 152 respond by transmitting back test results and status information over the TLM system 120.

In a like manner, TLM system 120 is connected to convertor unit 153 by vehicle bus 142. TLM system 120 can transmit test commands and convertor control commands such as convertor on/off, load shedding commands and real-time clock synchronization information, etc., to convertor unit 153. Convertor unit 153 responds by transmitting back test results and status information to TLM system 120.

TLM system 120 is connected to a friction brake unit 154 by vehicle bus 142. TLM system 120 transmits test commands, braking commands and real-time clock synchronization information, etc., to friction brake unit 154. Friction brake unit 154 responds by transmitting back test results and status information to TLM system 120.

TLM system 120 is also connected to an intermediate voltage power supply (IVPS) 155 and passenger communication unit 156 by vehicle bus 142. IVPS converts 600 volt power into 300 volts which is necessary since some of the subsystems, such as friction brake unit 154, use 300 volt power. TLM system 120 transmits test commands, IVPS control commands, such as IVPS on/off commands, and real-time clock synchronization information, etc., to IVPS 155 and IVPS 155 responds by transmitting back test results and status information to TLM system 120. TLM system 120 transmits test commands, real-time clock synchronization information, car serial number, relative car position, car orientation information, zero speed commands, door open and close commands, and odometer or speed signals, etc., to passenger communication unit 156. Passenger communication unit 156 responds by transmitting back test results and status information to TLM system 120.

TLM system 120 is also connected to other subsystems, such as a door control unit (not shown), a heating, ventilation and air conditioning (HVAC) unit (not shown), and a lighting unit 162, by vehicle bus 142. TLM system 120 transmits test commands, status requests, real-time clock synchronization information, car orientation information, etc., to the units. The units respond by transmitting back test results and status information.

Operator command input unit 172 of head car 114 may be a waterproof piezo keyboard having piezo keys integrated into a 5 mm aluminum plate and operated through a 0.8 mm aluminum cover plate. Console display 170 may be an electro-luminescent self-illuminated screen. Console 176 is a state driven device having a "power-up" state and a "operating" state.

If a car in train 112 is keyed-up, then operator console 176 is enabled and this car becomes the head car with redundant train bus masters 130A, 130B. At start-up, console display 170 displays results of power-up self-test. Then, TLM system 120 enters an "operating state." Console display 170 then displays a simple status message (OK, Warning, Failed or Non-existent) for each subsystem 150-164 on each car of train 112. The operator can use operator command input 172 to access diagnostic information on any of the subsystems 121 on any of the cars of train 112.

Information can also be transmitted or received by a wayside station using radio link 174 thereby reporting diagnostic alarms and acting as a diagnostic data dump at a specific point along the wayside.

In TLM 120 system shown in FIG. 1 in which the invention has particular usefulness, redundant train buses 132 are based on the DIN 43322 specification developed especially for the railroad environment, the subject matter of which is hereby incorporated by reference. It is configured as a master-slave communication system that uses a multi-drop RS-485 serial link. The serial data is Manchester encoded for higher reliability. This also allows it to pass through the galvanic isolation between cars. Train bus messages between vehicles are encoded into standard high level data link control (HDLC) data packets. During operation, the HDLC-encoded messages and protocol ensure data integrity and provide a way to request data retransmission if necessary.

Each vehicle bus 142 is based on the well known industry standard Intel BITBUS, the subject matter of which is hereby incorporated by reference. BITBUS is a master-slave communication system that uses a multi-drop RS-485 serial link. This provides a simple, expandable system to which all systems on the vehicle can easily interface. BITBUS messages are transmitted as synchronous data link control (SDLC) data packets. During operation, the SDLC-encoded messages and protocol ensure data integrity and provide a way to request data retransmission if necessary.

Figure 2:
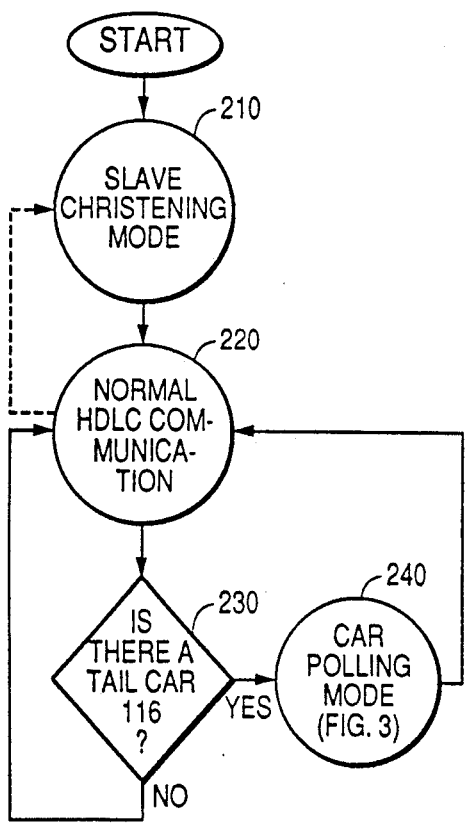
FIG. 2 is a hybrid flow chart and top-level state machine of a slave-additional-car-polling-sequence subprocess.

FIG. 2 is a hybrid flow chart and top-level state machine for a primary train bus slave 131A. Referring to FIG. 2, primary train bus slave 131A begins in a slave christening mode in state 210 as discussed in detail in commonly assigned U.S. patent application Ser. No. 07/853,796, filed concurrently herewith entitled "A Method and Apparatus For Christening a Trainline Monitor System." Normal HDLC communications are conducted via primary train bus slave 131A while primary train bus slave 131A is in state 220. For the purposes of understanding the present invention it suffices to say that christening is an initialization process whereby each node, i.e., each primary train bus slave 131A is assigned an address on primary train bus 132A of train 112 and checks (using auxiliary channel 132A2) to see if it is the last slave car on train 112 i.e., if it is tail car 116, at step 230 of FIG. 2. If primary train bus slave 131A is not the last car on train 112, primary train bus slave 131A returns to state 220 and continues with normal HDLC communications on TLM system 120. However, if primary train bus slave 131A is the last car on train 112, then flow proceeds to state 240 where a slave-additional-car-polling-sequence subprocess is conducted. The slave-additional-car-polling-sequence subprocess of state 240 is shown in detail in FIG. 3 and described below. After subprocess 240 is completed, primary train bus slave 131A then returns to normal HDLC communications on TLM system 120, i.e., returns to state 220.

Figure 3:
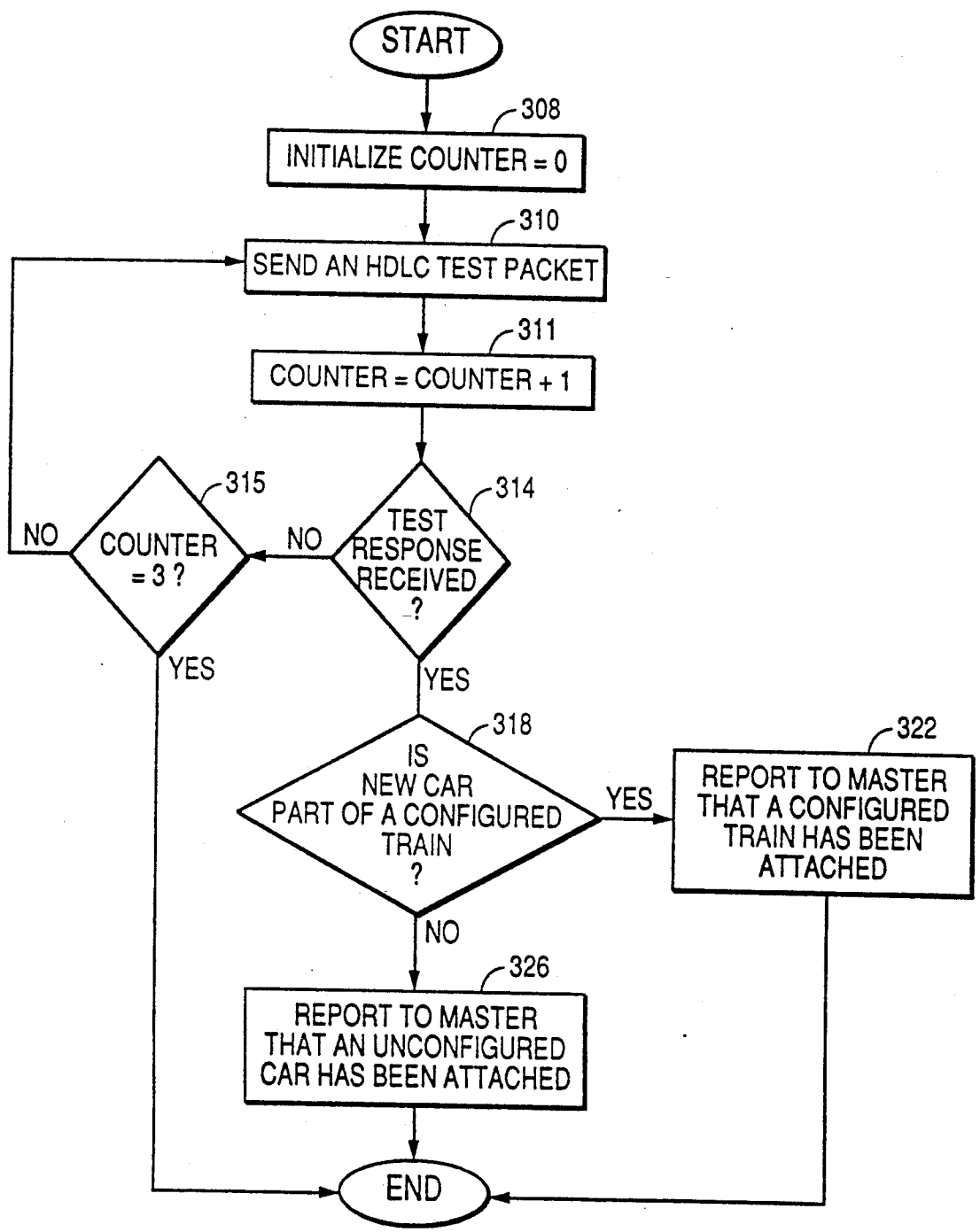
FIG. 3 is a flow chart showing an embodiment of the slave-additional-car-polling-sequence subprocess according to FIG. 2.

The slave-additional-car-polling-sequence subprocess of FIG. 3 begins at step 308 by initializing a counter. Step 310 involves sending an HDLC TEST packet from a primary train bus slave 131A on tail car 116 via auxiliary channel 132A2 of primary train bus 132A (it is assumed that primary train bus 132A is the active on of redundant train buses 132) to check if any new cars have been added to the train. The counter is then incremented by 1 at step 311. Last primary train bus slave 131A, i.e., the primary train bus slave on tail car 116, determines whether or not it has received an HDLC TEST response via auxiliary channel 132A2 of primary train bus 132A to the HDLC TEST packet at step 314. If no TEST response was received by last primary train bus slave 131A, last primary train bus slave 131A checks the counter at step 315 to see if it is equal to 3 and if so, the subprocess ends. If counter does not equal 3, then steps 310, 311 and 314 are repeated. If an HDLC TEST response is received by last primary train bus slave 131A, flow proceeds to step 318 where the last primary train bus slave 131A inspects the HDLC TEST response to determine whether it was sent from a primary train bus slave 131A on a new last car which has been added to the train, i.e., an "unconfigured car", or is from a primary train bus slave 131A on a car of a configured train, which has been attached to this train. If the HDLC TEST response is from a primary train bus slave 131A on a car which is part of an already configured new train, then at step 322 last primary train bus slave 131A sends an HDLC TEST message to primary train bus master 130A of train 112 that a configured train has been attached to train 112 and the subprocess ends. On the other hand, if the HDLC TEST response indicates that the new car is not part of a configured train, then at step 326 last primary train bus slave 131A on tail car 116 sends a message to primary train bus master 130A indicating that an unconfigured car has been attached to train 112. The subprocess then ends. Steps 308 to 326 are repeated every 10 bus cycles.

Figure 4:
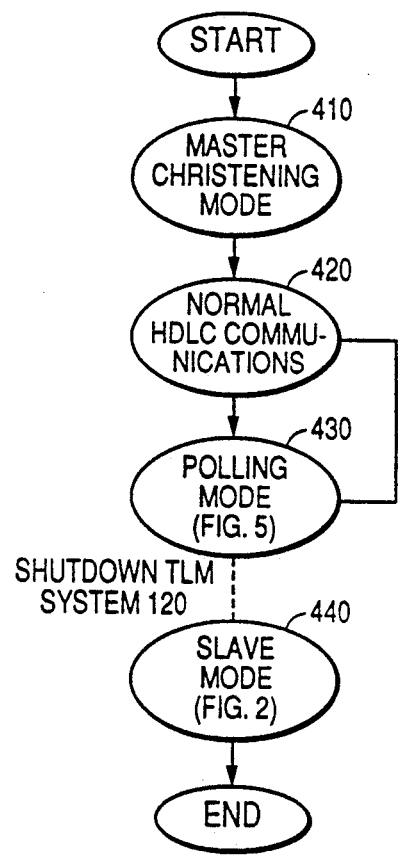
FIG. 4 is a hybrid flow chart and master top-level state machine of a master-additional-car-polling-sequence and multi-master-resolution-sequence.

FIG. 4 shows a hybrid flow chart and simplified master top-level state machine which begins by entering a master christening mode at state 410 in accordance with the disclosure of U.S. patent application No. 07/853,796 mentioned before. The state machine flow of primary train bus master 130A next proceeds to normal HDLC communications mode on TLM system 120 which is state 420. Primary train bus master 130A polls for new cars periodically (described in detail with reference to FIG. 5) at state 430 and upon completion of polling and depending on the results, then either returns to normal HDLC communications (state 420), or shuts down TLM system 120 and goes into the slave state machine described with respect to FIG. 2.

Figure 5:
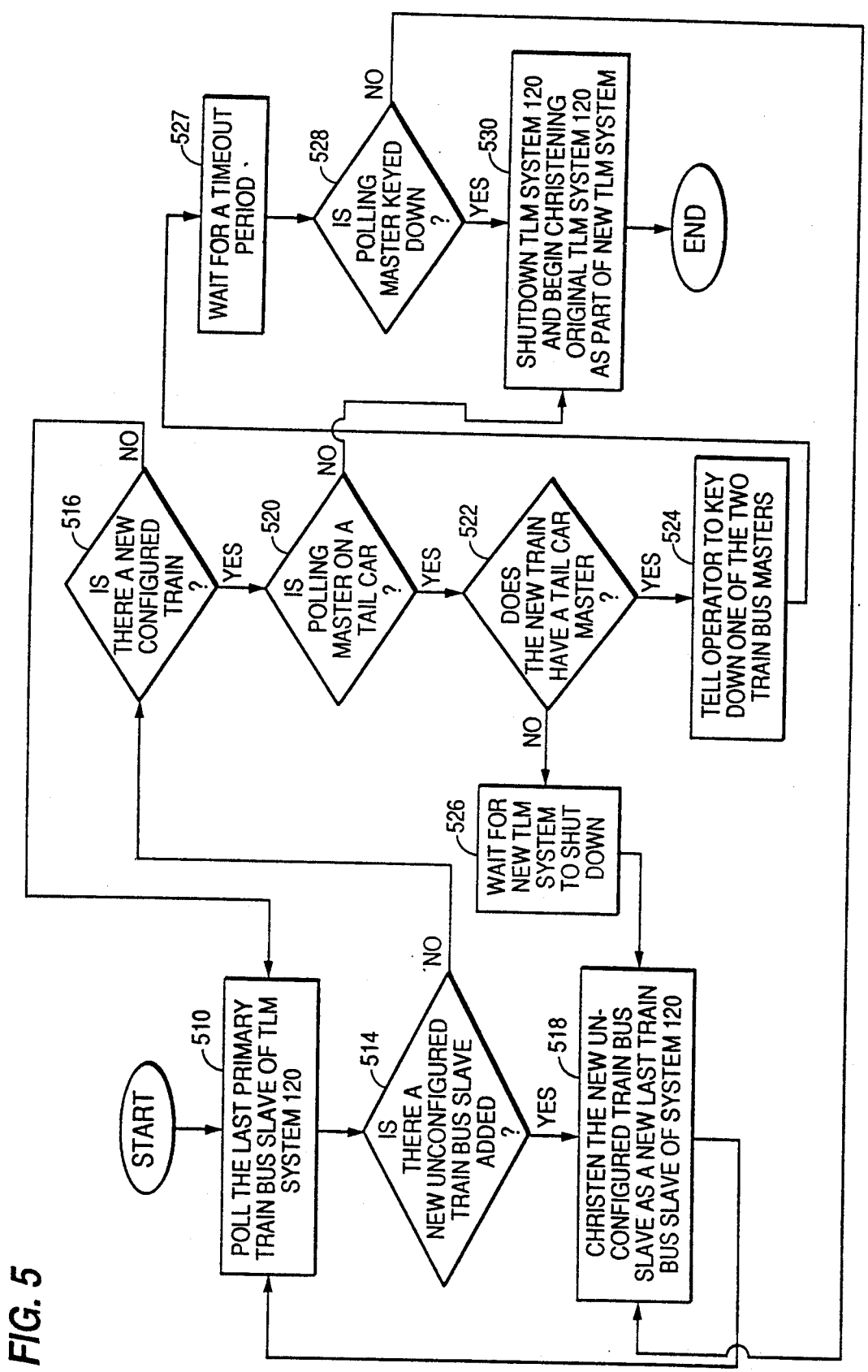
FIG. 5 is a flow chart showing an embodiment of the master-additional-car-polling-sequence and multi-master-resolution-sequence subprocess according to FIG. 4.
Figure 6:
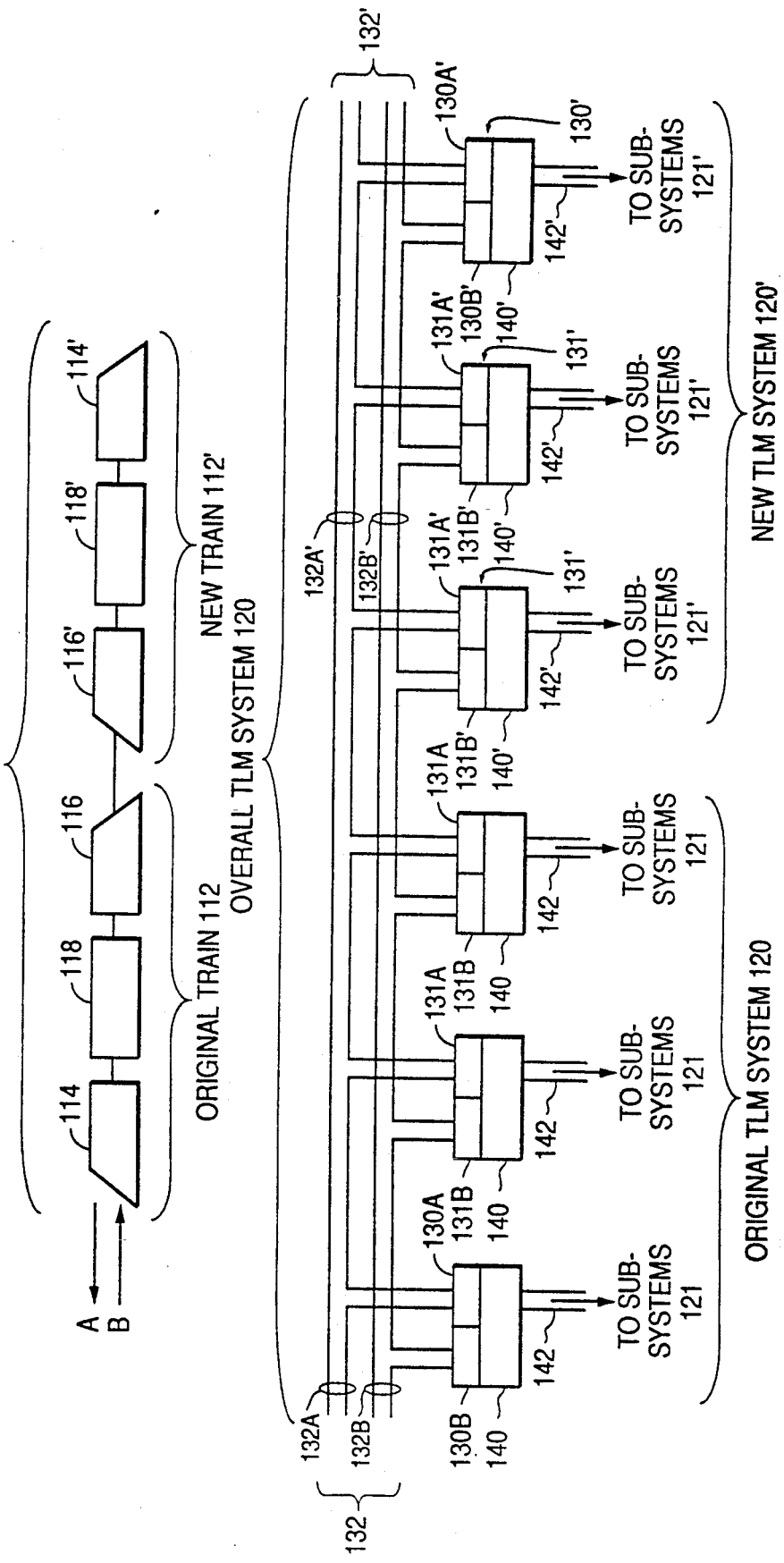
FIG. 6 is a schematic diagram of an overall trainline monitor system for an overall train made up of an original trainline monitor system for an original train and a new trainline monitor system for a new train.

FIG. 5 shows master-additional-car-polling-sequence and multi-master-resolution, i.e., the polling mode 430 of FIG. 4. At step 510, primary train bus master 130A polls last primary train bus slave (primary train bus slave 131A on tail car 116). At step 514, an HDLC TEST response is checked to determine whether it was sent from a new unconfigured train bus slave. If step 514 determines that there is no new unconfigured primary train bus slave, then at step 516 primary train bus master checks an HDLC TEST response to see if the HDLC TEST response was sent from a new primary train bus slave 131A' on a new train 112' as shown in FIG. 6. If step 516 determines that there is no new train 112', then step 510 is repeated.

If step 514 determines that the HDLC TEST response was sent via auxiliary channel 132A2 of primary train bus 132A by a new unconfigured primary train bus slave, then at step 518 primary train bus master 130A of TLM system 120 on train 112 begins to christen the new unconfigured primary train bus slave as a new last train bus slave (i.e., as a primary train bus slave 131A on TLM system 120 of train 112) according to the christening procedure discussed above and process returns to step 510.

If the result of the inquiry at step 516 was positive, that is, new primary train bus slave 131A' is part of a new TLM system 120' of a new train 112' as shown in FIG. 6, then at step 520 last primary train bus master 130A checks to see if it (primary train bus master 130A) is in a tail car 116 of train 112. If the result of step 520 is affirmative, then at step 522 primary train bus master 130A proceeds to check whether the new train 112' with the new TLM system 120' has a new primary train bus master 130A' in its tail car. If new train 112' does have a new primary train bus master 130A' in its tail car, then primary train bus master 130A sends an HDLC TEST packet to the operator of train 112 via console 176 and new primary train bus master 130A' sends an HDLC TEST packet to the operator of new train 112' via a new console (not shown) to key down one of primary train bus master 130A or new primary train bus master 130A' at step 524. On the other hand, if the new configured train does not have a primary train bus master on its new tail car, then at step 526 TLM system 120 pauses in order to allow enough time for new TLM system 120' to shut down. If primary train bus master 130A determines that it has been keyed down at step 528, then primary train bus master 130A proceeds to shut down TLM system 120 at step 530 ending the master-additional-car-polling-sequence and multi-master resolution process and new primary train bus master 130A' becomes an overall primary train bus master for an overall TLM system comprising TLM system 120 and new TLM system 120'. On the other hand, if primary train bus master 130A determines that it is not keyed down at step 528, then it proceeds to christen new primary train bus slaves 131A' at step 518 and primary train bus master 130A becomes an overall primary train bus master for an overall TLM system comprising TLM system 120 and the new TLM system 120'.

The invention has been described in detail with respect to preferred embodiments, and it will now be apparent from the foregoing to those skilled in the art the changes and modifications may be made without departing from the invention and its broader aspects, and the invention, therefore, in the appended claims to cover all such changes and modifications as fall within the true spirit of the invention.

What is claimed:

1. A method of multi-master resolution of a bus for a first configured train having a first communications network including a first bus, a master node and at least one slave node including an end slave node, comprising the steps of:

detecting additional nodes and determining if the additional nodes are part of another configured train;

if the additional nodes are part of another configured train including another master node, then performing bus master resolution as follows:

if the master node of the first configured train is not on a tail car of the first configured train, then reconfiguring the first configured train together with the another configured train giving bus control to the master node of the another configured train, if the master node of the first configured train is on a tail car of the first configured train, and if the master node of the another configured train is not on a tail car of the another configured train, then reconfiguring the first configured train together with the another configured train giving bus control to the master node of the first configured train, and if the master node of the first configured train is on a tail car of the first configured train, and if the master node of the another configured train is on a tail car of the another configured train, then signalling to an operator of the train to perform manual bus master resolution by keying down one of the two master nodes and thereafter reconfiguring the first configured train together with the another configured train giving bus control to the master node not keyed down by the operator.

2. The method according to claim 1, wherein the detecting additional nodes comprises:

periodically checking by the end slave node for additional nodes connected to the bus under command from the master node of the first configured train by sending a first TEST message on the bus, wherein additional nodes are detected by receipt of second TEST messages therefrom in response to the first TEST message.

3. The method according to claim 2, wherein whether the additional nodes are part of another configured train is determined by information contained in respective second TEST messages thereof.

4. The method according to claim 1, wherein if the additional nodes are not part of another configured train, the method further comprising:

reconfiguring the first configured train together with the additional nodes giving bus control to the master node of the first configured train.

5. The method according to claim 4, wherein the reconfiguring includes defining a new end slave node.

6. The method according to claim 2, wherein the first and second TEST messages are high level data link control packets.

7. An apparatus for multi-master resolution of a bus for a first configured train having a first communications network including a first bus, a master node and at least one slave node including an end slave node, comprising:

first means for detecting additional nodes and determining if the additional nodes are part of another configured train;

second means for performing bus master resolution if the additional nodes are part of another configured train including another master node, the second means including:

third means for reconfiguring the first configured train together with the another configured train giving bus control to the master node of the another configured train if the master node of the first configured train is not on a tail car of the first configured train, fourth means for reconfiguring the first configured train together with the another configured train giving bus control to the master node of the first configured train if the master node of the first configured train is on a tail car of the first configured train, and if the master node of the another configured train is not on a tail car of the another configured train, fifth means for signalling to an operator of the train to perform manual bus master resolution by keying down one of the two master nodes if the master node of the first configured train is on a tail car of the first configured train, and if the master node of the another configured train is on a tail car of the another configured train, and sixth means, responsive to the manual bus master resolution, for thereafter reconfiguring the first configured train together with the another configured train giving bus control to the master node not keyed down by the opertor.

* * * * *